United States Patent
Ng et al.

(10) Patent No.: US 6,909,786 B2
(45) Date of Patent: Jun. 21, 2005

(54) CRYPTOGRAPHIC TRAP DOOR WITH TIMED LOCK AND CONTROLLED ESCROW

(75) Inventors: Antony Peng Chew Ng, Singapore (SG); Hwee-Boon Chew, Singapore (SG)

(73) Assignee: D'Crypt Private Limited, Singapore (SG)

( * ) Notice: Subject to any disclaimer, the term of this patent is extended or adjusted under 35 U.S.C. 154(b) by 884 days.

(21) Appl. No.: 09/757,742

(22) Filed: Jan. 9, 2001

(65) Prior Publication Data

US 2002/0090091 A1 Jul. 11, 2002

(51) Int. Cl.$^7$ ................................. H04L 9/00
(52) U.S. Cl. ......................... 380/286; 713/171
(58) Field of Search ........................ 380/277, 286; 713/171; 705/71

(56) References Cited

U.S. PATENT DOCUMENTS

| | | | | |
|---|---|---|---|---|
| 6,330,671 B1 | * | 12/2001 | Aziz ........................... | 713/163 |
| 6,473,508 B1 | * | 10/2002 | Young et al. ................. | 380/30 |
| 6,731,758 B1 | * | 5/2004 | Graunke et al. ............ | 380/239 |

FOREIGN PATENT DOCUMENTS

SG    WO200057595    *    9/2000    ............. H04L/9/00

* cited by examiner

Primary Examiner—Andrew Caldwell
Assistant Examiner—Minh Dieu Nguyen
(74) Attorney, Agent, or Firm—Townsend and Townsend and Crew LLP

(57) ABSTRACT

In a secure communication employing keys which require updating, all parties to the communication update their keys according to a clock at a suitable agreed-upon interval, and the keys are updated once each interval via a one-way function. The key to be used for a communication is the one that is current when the communication is established. In order to address clock-slip and slight timing differences across a communication channel, each party to a paired communication send a current interval index of their key to the other party. The remote index, i.e., the interval index which is remote to the receiving party, is compared against the local interval index, and the latter of the two interval indexes is used as the basis for generating the key. The party with the earlier index must therefore update the key iteratively until its index is concurrent with the later index. In addition, a public-key, private-key pair is generated for the purpose of supporting key updating. To this end, an escrow agent is provided to generate the public-key and private key-pair and to distribute the public key to all parties wishing to engage in key updating, while securing the private key.

5 Claims, 2 Drawing Sheets

CRYPTOGRAPHIC TRAP DOOR WITH TIMED LOCK AND CONTROLLED ESCROW

BACKGROUND OF THE INVENTION

This invention relates to cryptography and more particularly to applications of public key techniques for generating and modifying session keys for establishing and maintaining communication sessions.

In order to understand the invention, it is helpful to understand the context of the underlying basis of the invention and its place in the field of cryptography. Cryptography is the technology of applying an efficient, bijective transformation on sensitive information (the "plaintext") to generate an equivalent but unintelligible representation of the same information (the "ciphertext") using a well-specified procedure or recipe (the "encryption algorithm"). Such a transformation should have a number of properties:

1. It should be parameterized by a relatively small piece of information (the key material).
2. Given the key material, the transformation from plaintext to ciphertext or vice versa should be efficient.
3. The problem of determining the plaintext from the ciphertext without the key is believed to be difficult, as herein defined.

The efficiency or difficulty of a problem is determined by the resources required for a well-specified computational procedure to complete a processing task. Except in singular cases, the time required for the processing is the resource that is considered for determining efficiency.

For the same given problem (e.g. to add up n numbers), it is clear that the size of the input determines the resources required. Summing 10 numbers is clearly faster than summing 1000 numbers. A problem admits an efficient solution if there exists an algorithm for solving the problem that has a running time that grows as a polynomial of the size of the input data. A problem is difficult if it can be shown that there does not exist an efficient algorithm for the problem. In more practical terms, a problem is difficult if all algorithms that solve the problem take time greater than a polynomial.

To date, no one has been able to show conclusively that any reasonable problem is "difficult." Mathematicians have therefore been able to formalize a related notion that is almost as powerful: There is a large group of problems for which the research community has not be able to find efficient algorithms. These problems are referred to as the NP-Complete problems. It is possible to show equivalence among these problems such that if anyone finds an efficient algorithm for any one of these problems, some simple machinery can be invoked to derive efficient algorithms for all the problems in the group. Since no solution to any problem in this class has been found to date, all problems in this group are believed to be difficult.

The notions of "efficient" and "difficult" are crucial to cryptography. The aim is to employ algorithms that would encrypt plaintext and decrypt ciphertext efficiently given the key in such a way that the problem of determining the plaintext from the ciphertext without knowledge the keys is believed to be difficult.

A cryptographic algorithm is considered "secure" if the problem of determining plaintext from the ciphertext is "believed to be difficult."

In the field of cryptography, a particular class of functions usually derived from NP-Complete problems is used as a tool. These functions are the so-called one-way functions.

A one-way function $f(x)$ has the property that given x, computing $f(x)$ is efficient. However, given y, the problem of finding x such that $f(x)=y$ is believed to be difficult. One-way functions have been used in authentication protocols like SKEY ("Applied Cryptography, Second Edition", Bruce Schneier, Wiley, 1996, page 53).

Keys are used to encrypt and decrypt messages. Keys are exchanged or otherwise generated and made available to parties to a communication. If two parties wish to change keys for each message, and do not want to retain and manage a large bank of keys, it is possible to apply a one-way function to generate a progression of keys, that is, the keys for message n+1 can be generated from the key for message n.

If in addition, the generation of key n+1 is accompanied by the destruction of key n, then all messages $\Delta$n are protected even if key n+1 is compromised, since deriving key n from key n+1 would mean attempting to attack or go against a one-way function, which something that is known or otherwise assumed to be difficult. This is referred to in the literature as "Key Updating" ("Applied Cryptography, Second Edition", Bruce Schneier, Wiley 1996, page 180).

While communication between two parties can be effected by typical key exchange and key updating techniques, a problem arises where multiple members of a group want to communicate securely. A conventional technique is to provide a separate key for each pair of communicants. However, if it is expedient to maintain a single key for the group and there is a desire to implement key updating, then the technology and protocol of key updating must be extended to the multiparty key updating case.

Consider a change in communication so that communication is only between two members of a group. As a result of the unique two-way communication, each must update their keys according to a common synchronization schedule which forces them to separate from the group. At the conclusion of their communication they will then be out of synchronization with the other members of the group who have not communicated and therefore have not updated their keys. One solution would be to broadcast a message to inform every member to update his/her keys. However, this is not an efficient solution. It would be wasteful of bandwidth, a valuable resource. What's more, some members may not be in communications with other members of the group and so they would not receive the message to update keys, with obvious security implications.

Known cryptographic trapdoor techniques are also vulnerable to the person-in-the-middle attack. Consider the example of two parties, Alice and Bob attempting to establish a secure communications channel, while an adversary, Mallory, can eavesdrop and modify the communicated information en route. What is needed is a mechanism to address this deficiency

SUMMARY OF THE INVENTION

According to the invention, in a secure communication employing keys which require updating, all parties to the communication update their keys according to a clock at a suitable agreed-upon interval, and the keys are updated once each interval via a one-way function. The key to be used for a communication is the one that is current when the communication is established. In order to address clock-slip and slight timing differences across a communication channel, each party to a paired communication send a current interval index of their key to the other party. The remote index, i.e., the interval index which is remote to the receiving party, is compared against the local interval index, and the later of the two interval indices is used as the basis for generating the key. The party with the earlier index must therefore update the key iteratively until its index is concurrent with the later index.

Further according to the invention, a public-key, private-key pair is generated for the purpose of supporting key updating. To this end, an escrow agent is provided to generate the public-key and private key-pair and to distribute the public key to all parties wishing to engage in key updating, while securing the private key.

With the public key, the encryption operation is easy to perform. However, since no one except the agent has the private key, decryption of the update is difficult therefore rendering inversion of the function is difficult. As such, the encryption operation of a public-key cryptosystem with a public key is a suitable one-way function for key updating, and can be applied for multiparty key updating as above. Furthermore, since the parties update their interval keys by encrypting it with the public key from the escrow agency and since the escrow agent does not know any of the interval keys in the updating sequence, the message is also difficult for anyone with access to the private key of the escrow agent to decrypt the messages.

It is an advantage of this invention that multi-party communications can be secure (to the accuracy of clock-slip) even in environments where communications is lost. It is also an advantage of this invention that keys can be distributed easily with minimal risk of compromise and a multi-party communications network can be more easily managed.

The invention will be better understood by reference to the following detailed description in connection with the following drawings.

DESCRIPTION OF THE SPECIFIC EMBODIMENTS

Figure 1:
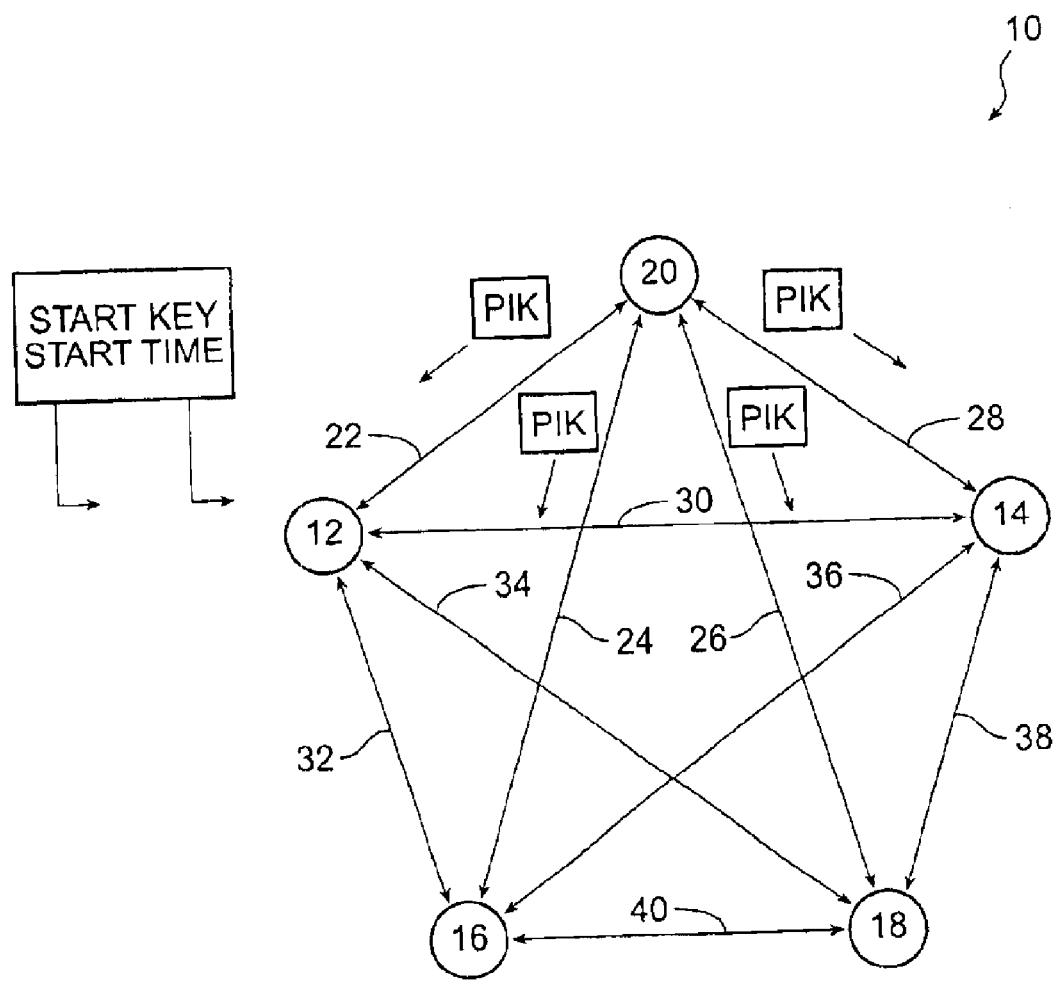
FIG. 1 is a block diagram for illustrating parties and communication channels in a secure communication system according to the invention.

Referring to FIG. 1, a secure communication system 10 is illustrated. A plurality of parties 12, 14, 16, 18, including an escrow agent 20 are interconnected by communication channels 22, 24, 26, 28, 30, 32, 34, 36, 38, 40. While in the past it would have been conventional to maintain a separate static key for each pair, or to maintain a single key for the group, in order to implement key updating, each pair references an interval key index, namely an index to the position along a common timeline.

Figure 2:
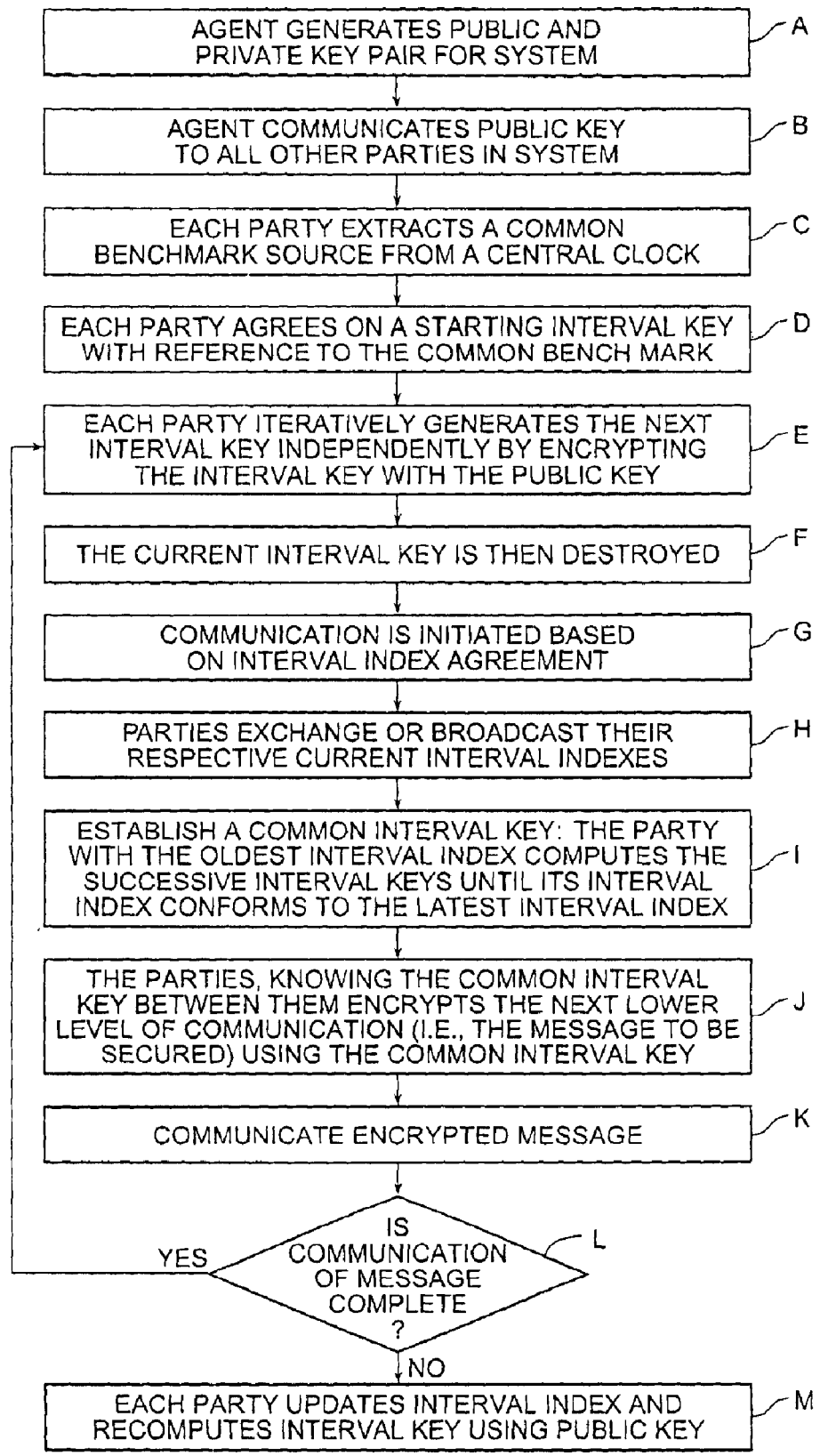
FIG. 2 is a block diagram of a key generation, key updating, key communication, and message communication sequence according to the invention.

This process is illustrated with reference to FIG. 2.

The escrow agent 20 provides a key role in that it generates a public key/private key pair in accordance with well known techniques (which need not be discussed here) which is then used as the basic key for securing the entire communication system 10 (Step A). The agent 20 then communicates the public key part of the system key to all other parties in the system 10 (Step B), while keeping the private key secured.

Each party can then use the public key to promote secure paired communication. Specifically, each party in the system 10 extracts a common benchmark, such as from a central clock (Step C). Significantly, it is not necessary that the parties actually operate exactly simultaneously relative to the central clock so long as they operate at a self-known offset relative to the same benchmark. Similarly, each party must agree on a starting interval key, which is referenced to the common benchmark (Step D). This starting interval key, for increased security for the whole system, would be selected independently and without knowledge by the escrow agent 20. In fact, it could be provided through a second escrow agent (not shown) which is independent of the main agent 20. In any event, there is thus a provision so that if there is cooperation between two elements or parties, they can engage in secure communications, as hereinafter explain, and in the event of failure of cooperation between either of the parties, the wronged party can reconstruct the secured information by reference back to a third party for assistance, which in this case is the escrow agent 20.

All parties update their own interval keys on an internal clock, each party iteratively generating the next interval key independently by encrypting the current interval key with the public key (Step E). A suitable interval is identified (e.g. 1 minute) and interval keys are updated typically once each interval via such an encryption mechanism as a one-way public key-type encryption function. (While it is within the contemplation of the invention to update the interval keys more often than once each interval, all parties in the system 10 (except the agent) must be in agreement as to the scheduling of the updates.)

To further secure the communication channel, once the new interval key is computed, the immediate past interval key is destroyed so its history cannot be reconstructed (Step F). There would be no point in updating a key if older keys were preserved.

A secure communication can then be effected, either by broadcast or through establishment of a pair-wise circuit (e.g., packet or circuit-switched) (Step G). The secure communication is based on interval key agreement. In the case of pairwise communication, each of the paired parties exchanges their respective interval indexes (not the interval key), whereas in the case of a broadcast, all parties broadcast their interval index, which all parties receive, and the broadcasting source employs the latest received interval index via a common communication channel or via all communication channels (Step H). The communication channel need not itself be secure, so long as the potential attacker does not participate in the system 10. (It is assumed that all members of a system are mutually trusting. Systems are not immune from insider attack, since by definition an insider need not attack the system.)

Thereafter a common interval key is established using the latest interval key (Step I). The interval key to be used for a paired communication is the one that is based on the latest interval key as between the pair. The interval key for a broadcast communication is the latest interval key among all interval keys known to the system. The latest interval key must be used, since earlier interval keys cannot be recovered, having been, according to the established protocol, destroyed.

In order to establish a common interval key, the party or parties with an interval index older than the latest interval index must each compute the successive interval keys until the local interval index conforms to the latest interval index, and then the latest interval key is extracted from that interval index.

Thereafter, the parties having knowledge of the common interval key among or between them proceed, without exchanging any key, to independently encrypt the next lower level of communication (i.e., the message to be secured) by using the common interval key (Step J). The parties then exchange (communicate) the encrypted message (Step K).

As the communication session proceeds, the index and the keys can be updated. The session is continued so long as the message is not complete (Step L), repeating from Step K, while optionally advancing the interval index and recomputing the interval key (Step M), so long as a cipher indicates at what point in the message the index is advanced. Once the message has been completed, each party also advances in the interval index (Step E) in preparation for the next session.

The present invention provides a barrier to the person in the middle attack. Referencing the example of Alice and Bob, the present invention has Alice and Bob exchange interval indices, which Alice and Bob interpret as receipt of an interval index (typically an integer). As such, any attempt by Mallory to modify the data-bits being communicated has the effect of replacing the interval index with a larger or smaller value. It is not possible for Mallory to have Alice and Bob interpret the received bits differently.

Alice and Bob use the larger of the local and remote interval index. The local index is a lower bound on the resulting interval index. As such, Mallory gains no advantage by lowering the value, but even if Mallory replaces the value with a larger one, the present invention resists defeat. Suppose the Alice and Bob carry interval indices of 10. They exchange the value 10, which Mallory replaces in both directions by the value 1000. Both parties will then advance to their 1000th key and use this key for communication, while Mallory eavesdrops on the communications and makes a copy of the encrypted data.

Other encryptors that are not a party to this communication have interval indices at or around 10. In the past, if such an encryptor is compromised before it has advanced to key 1000, Mallory will be able to advance the key to the 1000th key and decrypt the previously recorded message. The prior protocol thus fails to secure legacy messages.

According to the invention, the protocol is extended to two rounds. Following the example, where Alice and Bob initially have interval indices of 10. In the first round, Alice and Bob exchange interval indices (10) and Mallory modifies them as above (to 1000). However, the resulting key that the interval indices refer to (i.e. K1000) is not used to encrypt the message. Rather, it is used to encrypt the interval indices at both ends. The encrypted interval indices are then exchanged again. Since both sides have agreed to the key (K1000) they can decrypt the encrypted interval index. Unlike the first interval index, Mallory cannot modify this encrypted interval index without being detected. The key used for the session is actually the key that results from the second round of interval index exchanges.

The invention has many uses and implications. Consider a possible role for the escrow agent. With possession of the private key, the escrow agent can invert the one-way function but it cannot, independent of cooperation of one of the parties to a communication, decrypt the message.

If for example, law enforcement or government agencies wish to decrypt communications in a legal fashion, they can require the parties to disclose their current key. They can then apply the private key to roll them back to decrypt any legacy message.

Consider the example of a scenario where the keys are used to encrypt a financial or contractual transaction, and that the (encrypted) communications used to complete the transaction are logged by the escrow agent. In the event of a dispute, it is possible for the aggrieved party to surrender its current key to the escrow agent. With the current key and the ability to reverse the one-way function, the escrow agent is able to reconstruct the key used to encrypt the session, and therefore decrypt the transaction data.

The invention has been explained with reference to specific embodiments. Other embodiments will be evident to those of ordinary skill in the art. It is therefore not intended that this invention be limited, except as indicated by the appended claims.

What is claimed is:

1. A method for communication of messages in a secure manner in a communication environment which is subject to compromise, the method comprising:

providing an escrow agent, wherein said escrow agent generates a pair of keys comprising a first public key and a private key;

causing said escrow agent to communicate only said first public key to all parties within a communication system to be used to support secure communication;

extracting at each party a common benchmark;

agreeing among each party on a starting interval key referenced to said common benchmark;

causing each party to generate iteratively a next interval key independently of each other party but with reference to a common interval index, wherein only said starting interval key is encrypted by said first public key; thereafter initiating a secure communication between or among parties using reference to said common interval index and without communicating or exchanging their respective interval keys;

causing each party to a secure communication to encrypt a message to be secured using a common interval key independently computed by each said party based on said common interval index; and causing said encrypted message to be communicated within said communication system such that said encrypted message can be decrypted using said common interval key.

2. The method according to claim 1 wherein said parties exchange their respective interval indexes and wherein the parties with the older interval indexes advance their interval index and compute said interval key corresponding to the latest interval index.

3. The method according to claim 2 wherein each party destroys each prior interval key after a new interval key is generated so that an older interval key cannot be recovered.

4. The method according to claim 1 wherein maid interval index is not communicated to said escrow agent.

5. The method according to claim 1 wherein said starting interval key is not communicated to said escrow agent.

* * * * *